US009294875B2

(12) United States Patent
Ahn et al.

(10) Patent No.: US 9,294,875 B2
(45) Date of Patent: Mar. 22, 2016

(54) METHOD FOR DETERMINING POSITION OF TERMINAL IN CELLULAR MOBILE COMMUNICATION SYSTEM

(71) Applicant: Electronics & Telecommunications Research Institute, Daejeon (KR)

(72) Inventors: Jae Young Ahn, Daejeon (KR); Jae Heung Kim, Daejeon (KR); Young Jo Ko, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/348,248

(22) PCT Filed: Sep. 28, 2012

(86) PCT No.: PCT/KR2012/007957
§ 371 (c)(1),
(2) Date: Mar. 28, 2014

(87) PCT Pub. No.: WO2013/048210
PCT Pub. Date: Apr. 4, 2013

(65) Prior Publication Data
US 2014/0235273 A1    Aug. 21, 2014

(30) Foreign Application Priority Data
Sep. 30, 2011  (KR) .......................... 10-2011-0100118

(51) Int. Cl.
*H04W 4/02* (2009.01)
*G01S 5/02* (2010.01)
(Continued)

(52) U.S. Cl.
CPC ................ *H04W 4/02* (2013.01); *G01S 5/0236* (2013.01); *G01S 5/12* (2013.01); *H04W 64/00* (2013.01)

(58) Field of Classification Search
CPC .......... G01S 5/0236; G01S 5/12; H04W 4/02; H04W 64/00
USPC ........................................... 455/456.1, 456.2
See application file for complete search history.

(56) References Cited

U.S. PATENT DOCUMENTS

| 6,639,554 B2 | 10/2003 | Kim et al. |
| 2008/0014960 A1 | 1/2008 | Chou |

(Continued)

FOREIGN PATENT DOCUMENTS

| EP | 2237583 A1 | 10/2010 |
| KR | 10-2009-0040108 A | 4/2009 |

OTHER PUBLICATIONS

International Search Report for International Application No. PCT/KR2012/007957.

(Continued)

*Primary Examiner* — Barry Taylor
(74) *Attorney, Agent, or Firm* — LRK Patent Law Firm (57) ABSTRACT

Disclosed is a method for determining the position of a terminal. The method for determining the position of a terminal belonging to an overlay network environment comprises: a step in which the terminal transmits a position determination request to a positioning server; and a step in which the terminal receives, from the positioning server, position determination support information comprising a virtual cell ID allocated to transmission points surrounding the terminal. Therefore, using this method for determining the position of a terminal enables highly accurate position determination even in an overlay network environment in which a plurality of transmission points are configured so as to have the same cell ID.

15 Claims, 7 Drawing Sheets

(51) Int. Cl.
*G01S 5/12* (2006.01)
*H04W 64/00* (2009.01)

(56) References Cited

U.S. PATENT DOCUMENTS

| | | | |
|---|---|---|---|
| 2009/0174600 A1* | 7/2009 | Mazlum | G01S 19/50 342/357.58 |
| 2009/0280836 A1 | 11/2009 | Chou | |
| 2009/0286510 A1* | 11/2009 | Huber et al. | 455/410 |
| 2010/0317343 A1* | 12/2010 | Krishnamurthy et al. | 455/435.1 |
| 2012/0142313 A1* | 6/2012 | Edge | 455/410 |
| 2012/0329476 A1* | 12/2012 | Tenny | 455/456.1 |
| 2013/0051317 A1* | 2/2013 | Ji et al. | 370/328 |

OTHER PUBLICATIONS

Xiaorong et al., "Angle of Arrival Statistics for a 3-D Cylinder Model" In: Springer Science, Jan. 30, 2011 (abstract, figure 2 and their related detailed description).

* cited by examiner

- $z_{UE} = z_{BS} + 0.5*TA*3*10^8*\sin(AOA_{elevation})$
- $x_{UE} = x_{BS} + \sqrt{(0.5*TA*3*10^8)^2 - (z_{BS}-z_{UE})^2}*\cos(AOA_{azimuth})$
- $y_{UE} = y_{BS} + \sqrt{(0.5*TA*3*10^8)^2 - (z_{BS}-z_{UE})^2}*\sin(AOA_{azimuth})$

METHOD FOR DETERMINING POSITION OF TERMINAL IN CELLULAR MOBILE COMMUNICATION SYSTEM

TECHNICAL FIELD

The present invention relates to a method of positioning a terminal, and more particularly, to a method of positioning a terminal in a heterogeneous network environment and a positioning method that enables three-dimensional positioning of a terminal.

BACKGROUND ART

Various methods of positioning a terminal are considered in 3GPP that is being continuously standardized in the field of mobile communication.

Examples of a representative positioning method includes an OTDOA (Observed Time Difference of Arrival) scheme of positioning a terminal using a difference between arrival times of signals received from adjacent base stations, and an AOA+TA method of positioning a terminal using an AOA (Angle of Arrival) and a TA (Timing Advance) of a signal arriving from a base station. As another method, an A-GNSS (Assisted GNSS) and enhanced cell ID positioning method is defined, and a UTDOA (Uplink Time Difference of Arrival) and RF pattern matching method is expected to be adopted.

First, in the case of the OTDOA scheme, there may be a problem in coordinated multi-point transmission (COMP). A scenario of coordinated multi-point transmission for 3GPP LTE includes a scenario in which a heterogeneous network environment in which all transmission points, including a high power node (HPN; e.g., macro base station) and a number of low power nodes (LPNs; e.g., pico cells or remote radio heads (RRHs) connected to the macro base station) within coverage of the high power node, have the same physical cell IDs (PCIs) is assumed.

In a heterogeneous network environment in which all transmission points have the same PCIs, it may be difficult for a terminal to receive a signal (a positioning reference signal (PRS) or other reference signals) transmitted from a base station and the RRHs and determine its position. That is, since the terminal cannot identify the base station or the RRH from which the received signal has been transmitted, there may be a problem in applying the positioning method of the OTDOA scheme. In the OTDOA scheme, precision is improved as a radius of a cell is smaller, but since all nodes within the coverage use the same PCIs, the radius of the cell becomes equal to that of the macro cell, degrading precision.

Next, a positioning method in a current cellular mobile communication system, an altitude of a base station is not considered and, in most cases, the altitude of the terminal is assumed to be the same as that of a base station, which causes failure of determination of the altitude of the terminal and increase in positioning error.

DISCLOSURE

Technical Problem

An object of the present invention is to provide a method of positioning a terminal that enables positioning with high accuracy in a heterogeneous network environment in which a number of transmission points have the same cell IDs.

Another object of the present invention is to provide a method of positioning a terminal that enables three-dimensional positioning.

Technical Solution

According to an aspect of the present invention for achieving the object of the present invention described above, a method of positioning a terminal is a terminal operating method for positioning a terminal belonging to a heterogeneous network environment, the method including: transmitting, by the terminal, a positioning request to a positioning server; and receiving, by the terminal, positioning assistance information containing virtual cell IDs allocated to ambient transmission points around the terminal from the positioning server.

Here, the heterogeneous network environment may be an environment in which a plurality of transmission points having overlapping coverages have the same cell IDs.

Here, the positioning request may be transmitted from the terminal to the positioning server via a mobility management entity (MME). In this case, the mobility management entity may be configured to deliver at least one of an ID of the terminal and an ID of a transmission point having its coverage in which the terminal is included, to the positioning server.

Here, the method of positioning a terminal may further include notifying, by the terminal, the positioning server of results of measuring positioning reference signals (PRSs) of the ambient transmission points, and receiving position information of the terminal from the positioning server.

According to another aspect of the present invention for achieving the object of the present invention described above, a method of positioning a terminal is a terminal operating method for positioning a terminal belonging to a heterogeneous network environment, the method including making, by the terminal, a request for positioning assistance information to a positioning server, the request containing an ID of a serving cell of the terminal and at least one of an ID of the terminal and a virtual cell ID of an ambient transmission point around the terminal; and receiving, by the terminal, the positioning assistance information containing virtual cell IDs allocated to ambient transmission points around the terminal from the positioning server.

Here, the heterogeneous network environment may be an environment in which a plurality of transmission points having overlapping coverages have the same cell IDs.

Here, the method of positioning a terminal may further include: notifying, by the terminal, the positioning server of a result of measuring positioning reference signals (PRSs) of the ambient transmission points, and receiving position information of the terminal from the positioning server.

According to still another aspect of the present invention for achieving the object of the present invention described above, a method of positioning a terminal is a method of operating a mobility management entity (MME) and a positioning server to position a terminal belonging to a heterogeneous network environment, the method includes: receiving, by the mobility management entity, a positioning request from the terminal; transmitting, by the mobility management entity, the positioning request containing at least one of an ID of the terminal and an ID of a transmission point having its coverage in which the terminal is included, to the positioning server; and providing, by the positioning server, information containing virtual cell IDs allocated to ambient transmission points around the terminal, to the terminal in response to the positioning request.

Here, the heterogeneous network environment may be an environment in which a plurality of transmission points having overlapping coverages have the same cell IDs.

Here, the method of positioning a terminal may further include: receiving, by the positioning server, results of measuring positioning reference signals (PRSs) of the ambient transmission points from the terminal, and transmitting position information of the terminal to the terminal.

Here, the method of positioning a terminal may further include: providing, by the positioning server, an ID of the terminal to a serving cell base station to which the terminal belongs and receiving information for ambient points around the terminal from the base station.

According to another aspect of the present invention for achieving the other object of the present invention described above, a method of positioning a terminal may include: measuring a vertical-direction AOA ($AOA_{elevation}$) with respect to each base station; and measuring a timing advance (TA) value with respect to the base station.

Here, the method of positioning a terminal may further include: determining a position ($x_{UE}$, $y_{UE}$, $z_{UE}$) of the terminal based on the vertical-direction AOA ($AOA_{elevation}$) and the timing advance (TA) value with respect to each base station, and a three-dimensional geographical position ($x_{BS}$, $y_{BS}$, $z_{BS}$) of each base station.

Here, the method may further include: additionally measuring a horizontal-direction AOA ($AOA_{azimuth}$) with respect to the base station having the highest AOA measurement reliability with respect to the terminal among the base stations, and determining a position ($x_{UE}$, $y_{UE}$, $z_{UE}$) of the terminal based on the horizontal-direction AOA ($AOA_{azimuth}$), the vertical-direction AOA ($AOA_{elevation}$) and the timing advance (TA) value with respect to the base station, and a three-dimensional geographical position ($x_{BS}$, $y_{BS}$, $z_{BS}$) of the base station.

Advantageous Effects

Using the method of positioning a terminal according to the present invention, it is possible to increase accuracy of positioning a terminal in a heterogeneous network environment in which a number of transmission points have the same cell ID. The present invention can be applied to both terminals conforming to standards up to 3GPP LTE release 10 and terminals conforming to standards from 3GPP LTE release 11.

Further, the present invention provides a method capable of three-dimensional positioning of a terminal, as well as two-dimensional positioning, by enhancing a conventional method of positioning a terminal capable of only two-dimensional positioning.

BEST MODE

Various changes may be made to the present invention, and the present invention have several embodiments. Specific embodiments of the present invention will be described in detail with reference to the accompanying drawings.

However, the description proposed herein is not intended to limit the present invention to specific embodiments, so it should be understood that other equivalents and modifications could be made to the present invention without departing from the spirit and scope of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "terminal" or "device" used herein may refer to a mobile station (MS), user equipment (UE), a user terminal (UT), a wireless terminal, an access terminal (AT), a subscriber unit, a subscriber station (SS), a wireless device, a wireless communication device, a wireless transmit/receive unit (WTRU), a mobile node, a mobile, or other terms. Various embodiments of a device may include a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, a music storing and playing appliance having a wireless communication function, an Internet home appliance capable of wireless Internet access and browsing, and also portable units or terminals having a combination of such functions, but the present invention is not limited thereto.

The term "base station" used herein generally denotes a fixed or mobile point communicating with a device, and may be referred to as a base station, Node-B, evolved Node-B (eNode-B), a base transceiver system (BTS), an access point, a relay, a femtocell, and other terms.

Hereinafter, example embodiments of the present invention will be described in detail with reference to the accompanying drawings. In describing the present invention, the same elements in the drawings will be designated by the same reference numerals in order to facilitate entire understanding and a duplicate description of the same elements will be omitted.

In this disclosure, a 3GPP LTE cellular mobile communication system is assumed as an embodiment for explaining the present invention, but it is apparent to those skilled in the art that the present invention may be applied to all cellular mobile communication systems, including a 3GPP LTE cellular mobile communication system, without departing from the scope and spirit of the invention.

In an example of the cellular mobile communication system, scenarios of coordinated multi-point transmission for 3GPP LTE include scenario 3 in which a heterogeneous network environment in which all of a number of low power nodes (LPNs; e.g., pico cells or remote radio heads (RRHs) connected to a macro base station) within coverage of a high power node (HPN; e.g., macro base station) have different physical cell IDs (PCIs) is assumed, and scenario 4 in which a heterogeneous network environment in which all the transmission points (the HPN and the LPNs in scenario 3) have the same PCI, is assumed.

Figure 1:
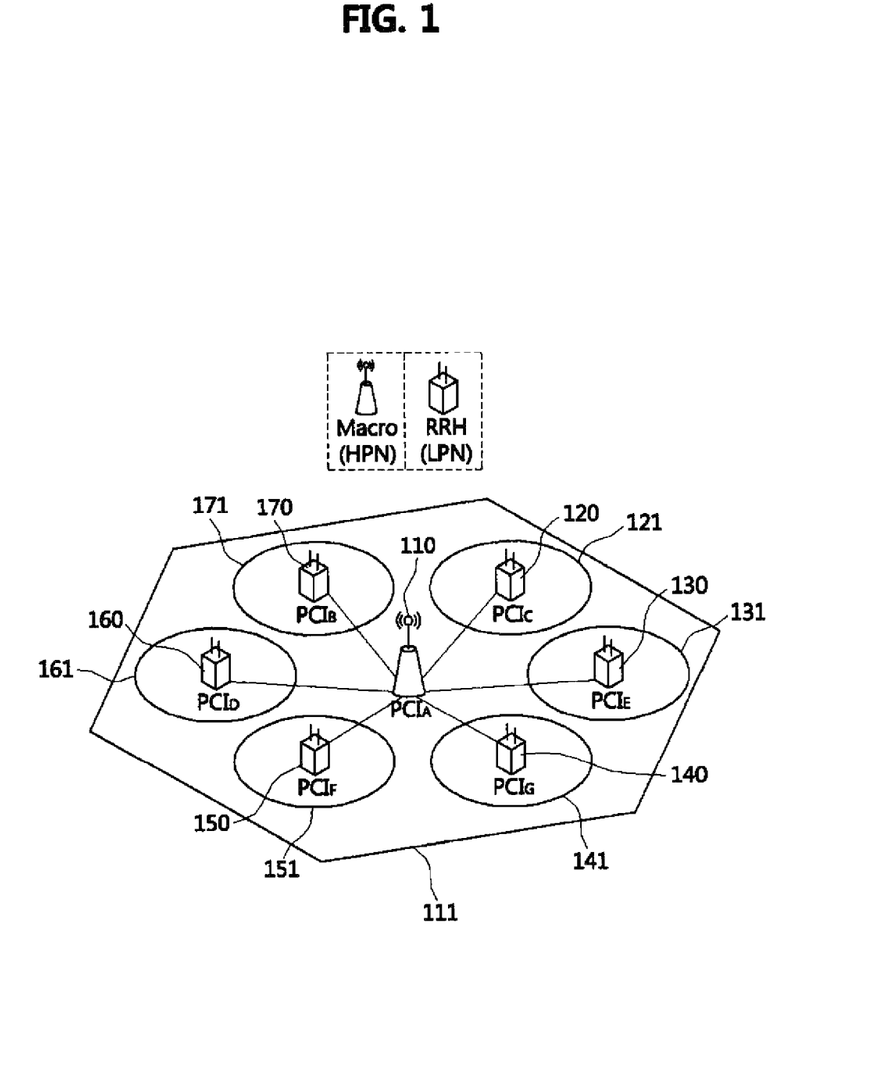
FIG. 1 is a conceptual diagram illustrating a heterogeneous network environment in which a number of transmission points have different cell IDs.

FIG. 1 is a conceptual diagram illustrating a heterogeneous network environment in which a number of transmission points have different cell IDs.

Referring to FIG. 1, a heterogeneous network environment in which, generally, a high power node (HPN; which may generally indicate a conventional macro base station) 100 and low power nodes (LPNs) 120, 130, 140, 150, 160, and 170, including a RRH, are present in the form in which their respective coverages 111, 121, 131, 141, 151, 161, and 171) overlap, is illustrated.

Here, the respective nodes have different cell IDs (e.g., PCIs; $PCI_A$, $PCI_B$, $PCI_C$, $PCI_D$, $PCI_E$, $PCI_F$, and $PCI_G$).

Figure 2:
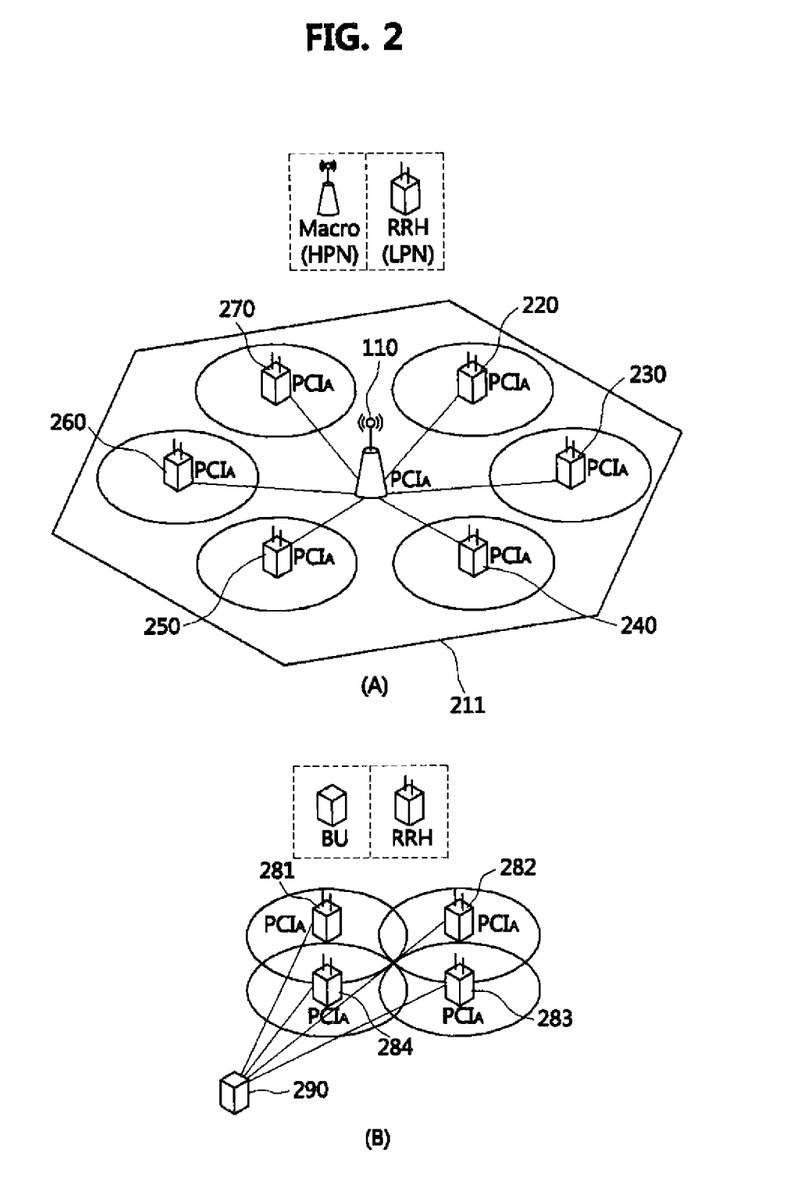
FIG. 2 is a conceptual diagram illustrating a heterogeneous network environment in which a number of points have the same cell ID.

On the other hand, FIG. 2 is a conceptual diagram illustrating a heterogeneous network environment in which a number of transmission points have the same cell IDs, and is a conceptual diagram illustrating a configuration in which a number of points have one cell ID (e.g., PCI; $PCI_A$) based on scenario 4 described above.

Referring to FIG. 2, FIG. 2(a) illustrates an environment in which all of a high power node (generally, macro base station) 210 and a number of low power nodes 220 to 270 within coverage of the high power node have the same cell ID (e.g., PCI; $PCI_A$).

Meanwhile, FIG. 2(b) illustrates a distributed antenna network environment in which nodes (RRHs) 281 to 284 having similar outputs and the same cell ID (e.g., PCI; $PCI_A$) are connected to a base-band processing unit (BU) 290 (e.g., via an optical cable).

Such a distributed network environment may be variously built above a scope of such an illustration in FIG. 2. That is, the distributed network environment may be defined as an environment in which a number of transmission points form one cell while sharing the same PCI, and various configurations satisfying such a definition may be possible.

Referring to FIGS. 2(a) and 2(b), a problem in positioning a terminal of the OTDOA scheme among the scenarios of current coordinated multi-point transmission may be described.

In FIGS. 2(a) and 2(b), a heterogeneous network environment in which a number of low power nodes are present within coverage of a base station eNB is illustrated. The low power nodes (e.g., RRH (Remote Radio Head) are configured to perform coordinated multi-point transmission to the terminals present within the coverages together with the macro base station.

In FIGS. 2(a) and 2(b), the low power nodes are illustrated as having the same PCI value as the base station (the high power node), and a number of points are illustrated as having the same PCI value. That is, a number of points have the same PCI ($PCI_A$) value, and form one cell.

Here, one transmission device including at least one antenna having capability of transmitting and receiving data may be referred to as a "transmission point" or a point, which is a concept generally indicating a conventional device such as a base station, a picocell, a femtocell, or an RRH.

In a case in which a number of points have the same PCI, including CoMP scenario 4, it may be difficult for a terminal to receive signals (positioning reference signals (PRSs) or other reference signals) transmitted from the base station and the RRHs and determine its own position. That is, since the terminal cannot identify the base station or RRH from which the received signal has been transmitted, there may be a problem in applying the positioning method using the OTDOA scheme. In the OTDOA, precision is improved as a radius of a cell is small, but since all the nodes within the coverage use the same PCI, the radius of the cell becomes equal to that of the macro cell, thus degrading the precision.

A Method of Positioning a Terminal in a Heterogeneous Network Environment

Figure 3:
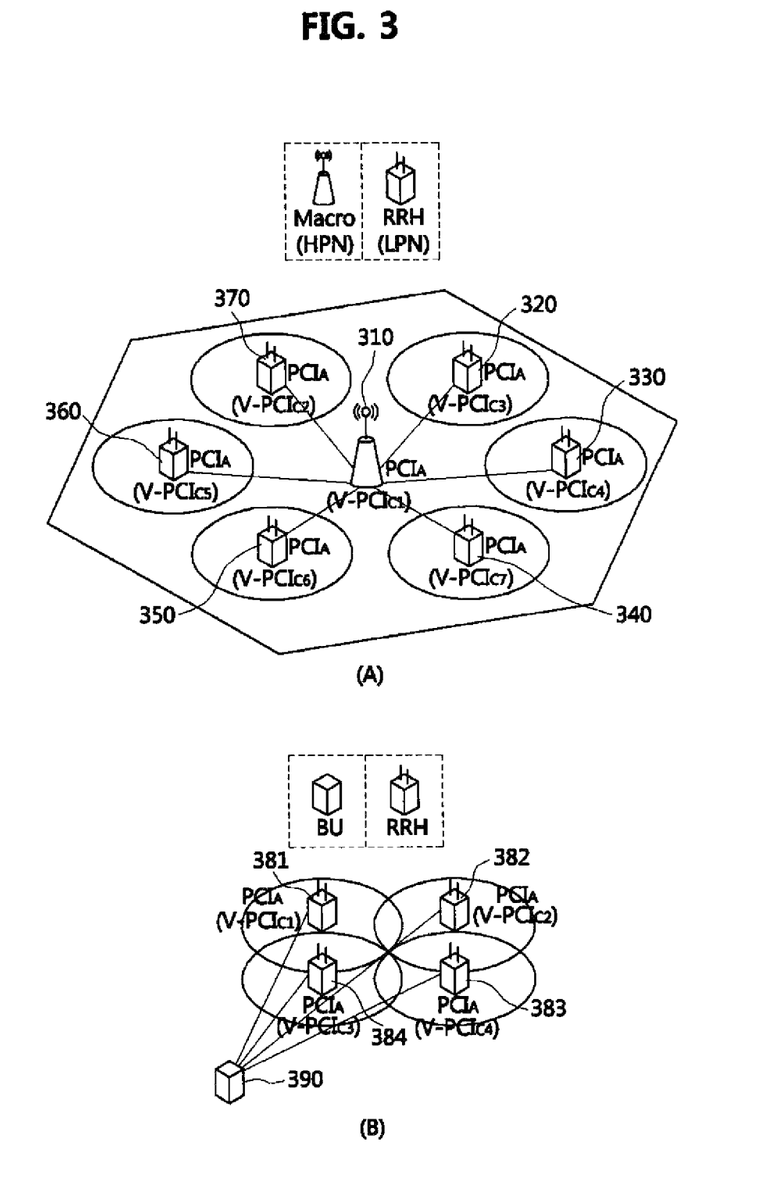
FIG. 3 is a conceptual diagram illustrating a method of positioning a terminal according to the present invention.

FIG. 3 is a conceptual diagram illustrating a method of positioning a terminal according to the present invention.

The method of positioning a terminal according to the present invention is a method for enhancing positioning precision by allocating different virtual PCIs (hereinafter, V-PCIs; $V\text{-}PCI_{C1}$, $V\text{-}PCI_{C2}$, $V\text{-}PCI_{C3}$, $V\text{-}PCI_{C4}$, $V\text{-}PCI_{C5}$, . . . ) for positioning to a number of points 310 to 370 and 381 to 384 even when the points 310 to 370 and 381 to 384 have the same PCI.

That is, the terminals may be configured to receive V-PCIs of ambient points and V-PCIs of points belonging to an ambient base station (a PCI when the base station includes only one point) from a positioning server, and use the V-PCIs to report measurement result values of positioning reference signals (PRSs) of the ambient points and other ambient base stations.

In this case, the ambient points should be configured to generate and transmit PRSs corresponding to their own allocated V-PCIs. In this case, a reference point or a base station for estimation of a reference signal time difference (RSTD) may be configured to be notified of from the positioning server to the terminal.

Through this, even in CoMP scenario 4, positioning becomes possible with the same precision as that in CoMP scenario 3.

Meanwhile, both a method capable of implementing the positioning method of the present invention without changing conventional terminals in consideration of comparability with the conventional terminals, and a method capable of implementing the positioning method of the present invention for terminals newly defined in a standard should be considered in order to implement the above-described method of positioning a terminal in a heterogeneous network environment.

First, a concept for applying the above-described method of positioning a terminal in a coordinated multi-point transmission according to the present invention to a terminal, including a legacy terminal (i.e., a 3GPP LTE release 9 or 10 terminal), will be described.

Figure 4:
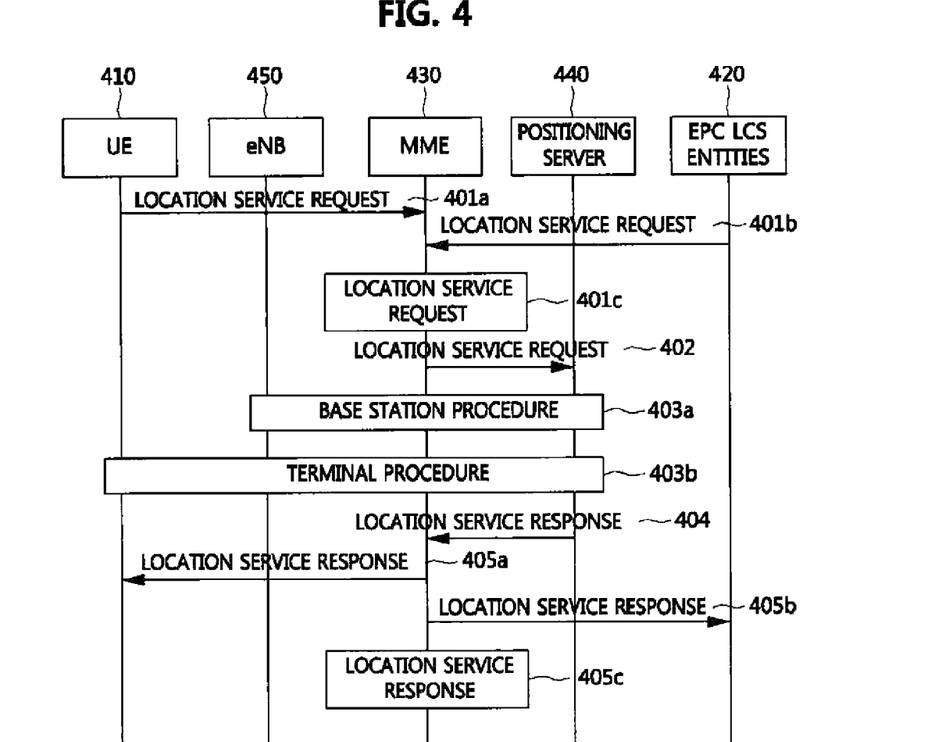
FIG. 4 is a message flow diagram illustrating an example of a method of positioning a terminal according to the present invention.

FIG. 4 is a message flow diagram illustrating an example of a method of positioning a terminal according to the present invention.

A positioning procedure (LTE positioning protocol; LPP) between a positioning server and a positioning target terminal is defined in current standard document TS36.355 of 3GPP LTE, and a procedure (LPPa: LTE positioning protocol A) of providing data from a base station to a positioning server in order to support downlink OTDOA positioning is also defined in TS36.455.

Referring to FIG. 4, a terminal 410 or an evolved packet core (EPC) location service (LCS) entity 420 desiring to be positioned delivers a request to a mobility management entity (MME) 430 to position the terminal, the EPC LCS entity, or a specific terminal (401a or 401b), and the MME generates a location service request (401c), and transmits the generated request to the positioning server 440 (402) to initiate positioning. Meanwhile, the EPC LCS entity is a target desiring to be positioned and may be generally referred to as a terminal.

Meanwhile, the positioning server may be an enhanced serving mobile location center (E-SMLC) or a secure user plane location platform (SLP) in 3GPP LTE, which will be generally referred to as a positioning server since it is a server that provides position information of the positioning target terminal.

That is, in the procedure (403a), the positioning server 440 exchanges information with the base station (eNB) 450 according to the procedure defined in LPPa, and collects information for ambient points around the terminals 410 and 420 requesting the positioning.

Figure 5:
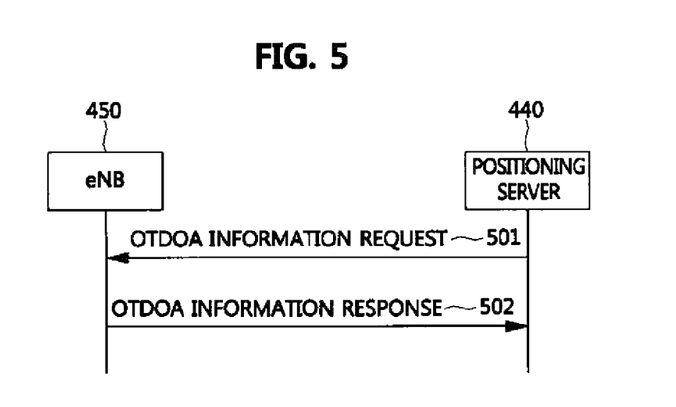
FIG. 5 is a message flow diagram illustrating an LPPa procedure between eNB and a positioning server.

FIG. 5 is a message flow diagram illustrating the LPPa procedure between the eNB and the positioning server.

That is, the positioning server 440 transmits an "OTODA INFORMATION REQUEST" (501) to the eNB 450 to request information, and the eNB 450 collects information for ambient points around the terminal requesting the positioning through an "OTODA INFORMATION REQUEST" (502), and transmits the information to the positioning server. The procedure in FIG. 5 is included in the base station procedure (403b) in FIG. 4.

Next, the terminal requests the positioning server to provide information (Assistance Data) for the reference point and the ambient points that are PRS measurement targets, and the positioning server provides the requested information to the terminal. The terminal transmits measurement results of the positioning reference signal for the ambient points to the positioning server. That is, this procedure between the positioning server and the terminal is performed according to the procedure defined in the LPP (403b in FIG. 4).

The positioning server performs positioning of the terminal based on the measurement results obtained in the procedure (403b in FIG. 4), and transmits the results of the performed positioning to the MME (404 in FIG. 4), and the MME sends the results of the performed positioning to the positioning target (405a and 405b in FIG. 4).

First, in the positioning method according to the present invention, each point should transmit the PRS corresponding to the virtual PCI for positioning, and the positioning server should recognize such a situation. For this, a method by which the base station is instructed to allocate the V-PCIs to the points belonging to the cell of the base station (which is possible, for example, through OA&M-Operation Administration Management protocol) is necessary, and the positioning server can know this through the following procedure. That is, LPPa protocol in which a terminal is not involved should be modified instead of LPP protocol in which a terminal is involved, such that the positioning method according to the present invention can be applied to legacy terminals.

When the MME sends a "Location Service Request" to the positioning server (procedure 402 in FIG. 4), an identification ID of the corresponding terminal and the coverage of the base station (eNB) in which the terminal is present can be known to the positioning server.

Accordingly, when the positioning server requests eNB to which the terminal belongs to provide an "OTODA INFORMATION REQUEST", the positioning server provides the identification ID of the terminal so that eNB provides information (V-PCIs, PCIs, etc.) for points near the terminal and ambient points to the positioning server (that is, this is a modification of the LPPa procedure).

The positioning server may be provided with necessary information (V-PCIs of the corresponding base station points, or a PCI when the base station includes only one point) from ambient eNBs around the corresponding eNB. In this case, it is unnecessary to send the ID of the terminal when requesting the information. If the positioning server knows points/base stations near a specific point through OA&M, the provision of information from the ambient eNBs may be unnecessary.

Based on this, the positioning server delivers positioning assistance information (assistance data; the V-PCI/PCI of the reference point and an ambient point/base station that should report an RSTD and setting information necessary for PRS measurement) to the terminal (in this case, it is unnecessary to change the LPP procedure).

However, according to the current standard, "RequestAssistanceData" that the terminal sends when requesting positioning to the positioning server is only defined to be sent with a PCI of the base station serving the terminal (ECGI, if necessary), and accordingly, the positioning server does not know a terminal from which the request is received. That is, "RequestAssistanceData" in the current LPP procedure is configured to request using the PCI of the base station serving the terminal, and accordingly, when a procedure in which a request is made by the terminal and assistance data is delivered as a response to the terminal, is performed, it is difficult for the positioning server to appropriately respond since the positioning server does not know a point near the terminal.

Accordingly, in the present invention, since the positioning server has already known the ID of the terminal having requested positioning service through the enhanced LPPa procedure described above, the positioning server may be configured to deliver the assistance data using the known ID of the terminal (unsolicited assistance data delivery) even when "RequestAssistanceData" is not requested from the terminal (or without utilizing "RequestAssistanceData" when "RequestAssistanceData" is requested).

Figure 6:
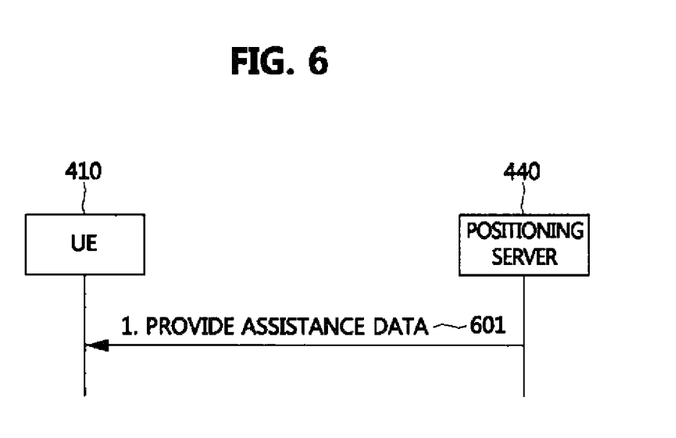
FIG. 6 is a message flow diagram illustrating an example of a procedure of delivering positioning assistance information from a positioning server to a terminal according to the present invention.

FIG. 6 is a message flow diagram illustrating an example of a procedure of delivering positioning assistance information from the positioning server to the terminal according to the present invention.

Referring to FIG. 6, a process in which the positioning server delivers positioning assistance information (assistance data) using the known ID of the terminal through a "ProvideAssistanceData" message 601 without receiving the "RequestAssistanceData" message from the terminal according to the present invention (which is compared with a procedure in FIG. 7 that will be described below).

Meanwhile, a concept for applying the method of positioning a terminal in a scenario of coordinated multi-point transmission according to the present invention to a terminal conforming to 3GPP LTE release 11 or subsequent versions), will be described hereinafter.

The same method as that applied to the legacy terminal described above may also be applied to the terminal conforming to 3GPP LTE release 11 or subsequent versions (hereinafter referred to as a rel-1× terminal), or new methods that will be described below may be applied.

The new methods that will be described below are to apply the same procedure as that applied to the legacy terminal described above up to procedure 403a in FIG. 4 (i.e., a definition of a new message in LPPa is applied as it is), and newly enhance the procedure of providing the assistance data in the LPP (i.e., modification of the LPP protocol).

Figure 7:
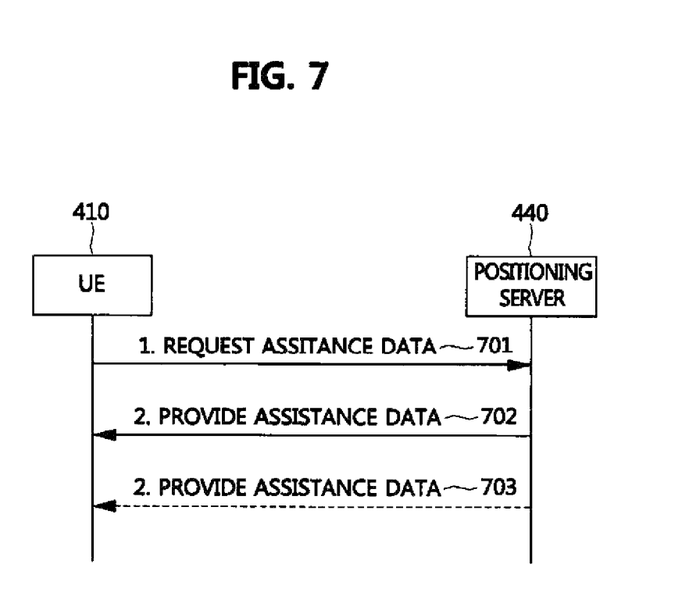
FIG. 7 is a message flow diagram illustrating another example of a procedure of delivering positioning assistance information from the positioning server to the terminal according to the present invention.

FIG. 7 is a message flow diagram illustrating another example of a procedure of delivering positioning assistance information from the positioning server to the terminal according to the present invention.

Information contained in "RequestAssistanceData" (701) delivered from the terminal 410 to the positioning server 440 in FIG. 7 may be constructed differently according to methods that will be described below.

A first method is a method in which the Rel-1× terminal sends the "RequestAssistanceData" message containing the PCI of a serving cell of the terminal and the V-PCI of a nearest point (a serving point) to the positioning server when transmitting the "RequestAssistanceData" message to the positioning server. In this case, since the positioning server knows ambient points around (the) such points through the process 403a described above (or through OA&M), the positioning server may appropriately provide information (PCIs or V-PCIs) for the ambient points to the terminal.

A second method is a method in which the Rel-1× terminal sends the "RequestAssistanceData" message containing the PCI of the serving cell of the terminal and an ID of the terminal (an UE ID) to the positioning server when transmitting the "RequestAssistanceData" message to the positioning server. In this case, since the positioning server knows the ambient points around the terminal through the process 403a described above (or through OA&M), the positioning server may appropriately provide information (PCIs or V-PCIs) for the ambient points to the terminal.

In response to the positioning assistance information request (701) from the terminal using at least one of the two methods described above, the positioning server transmits the positioning assistance information (assistance data) to the terminal using "ProvideAssistanceData" massages 702 and 703.

In this case, the V-PCI/PCI of the reference point and the ambient point/base station that should report the RSTD and setting information necessary for PRS measurement are contained in the positioning assistance information (assistance data), as described above.

Meanwhile, while in the above-described embodiments, concrete names of the messages transmitted and received between the terminal, the MME and the positioning server have been described as names used in the 3GPP LTE standard, it should be noted that the respective messages are specified by roles and functions of contained information and do not depend on the concrete names. For example, in future standards, the names of the messages may be changed while maintaining the same functions, and one message may be integrated into the other message having a similar function.

Method of Three-Dimensionally Positioning a Terminal

In a positioning method in a current cellular mobile communication system, an altitude of a base station is not considered and, in most cases, an altitude of a terminal is assumed to be the same as that of the base station, which causes failure of determination of the altitude of the terminal and increase in positioning errors. In order to resolve this problem, in the present invention, a vertical-direction AOA of the terminal is measured and used to three-dimensionally position the terminal.

Figure 8:
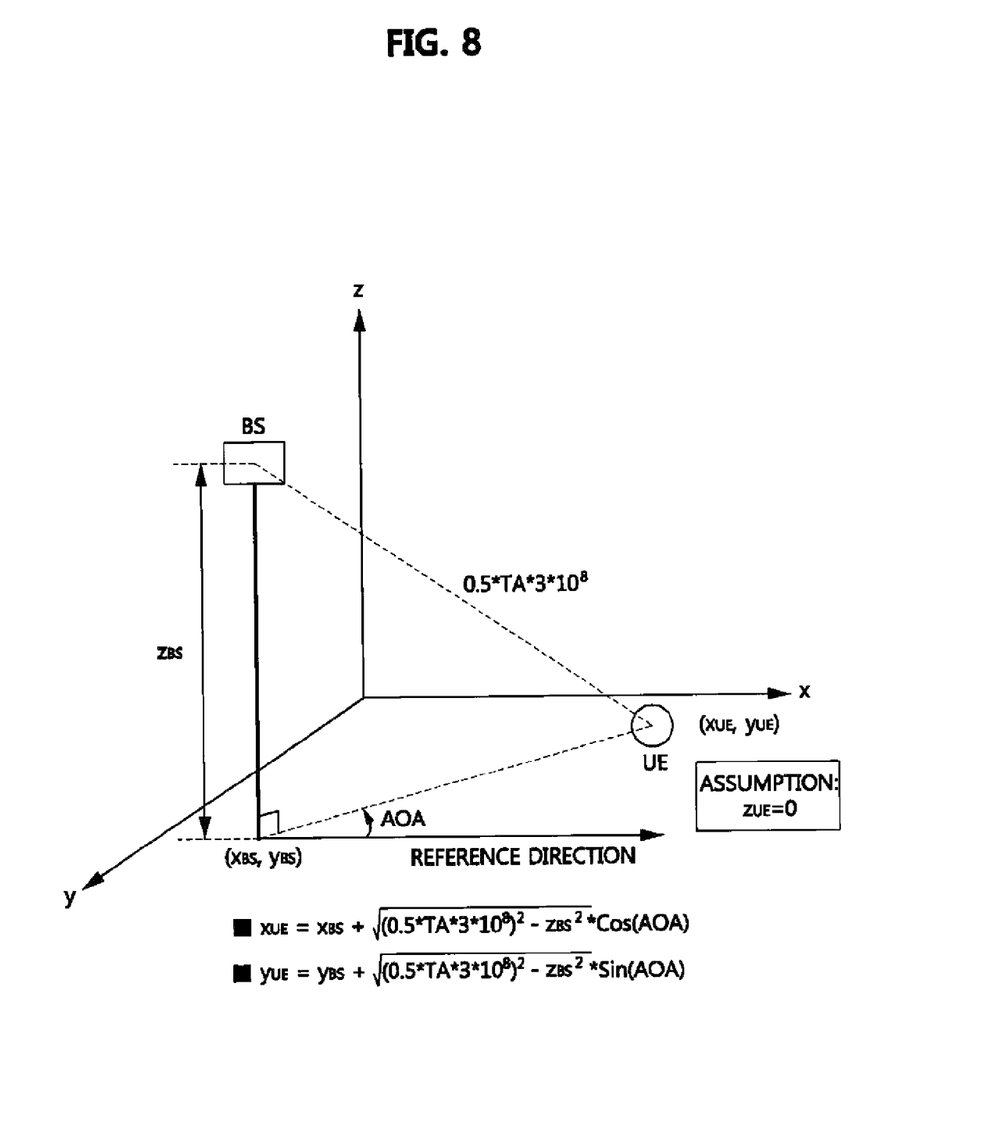
FIG. 8 is a conceptual diagram illustrating a method of positioning a terminal according to an AOA+TA method.

FIG. 8 is a conceptual diagram illustrating a method of positioning a terminal according to a conventional AOA+TA method.

Referring to FIG. 8, in the conventional method, a horizontal-direction AOA measurement value (AOA) of a terminal (UE), a TA measurement value (TA) of the terminal, a geographical position ($x_{BS}$, $y_{BS}$) of a base station, and an altitude ($Z_{BS}$) of the base station are input to position the terminal (UE).

In this case, a position ($x_{UE}$, $y_{UE}$) of the terminal may be calculated by the following equation 1:

$$x_{UE} = x_{BS} + \sqrt{(0.5*TA*3*10^8)^2 - Z_{BS}^2} * \cos(AOA)$$

$$y_{UE} = y_{BS} + \sqrt{(0.5*TA*3*10^8)^2 - Z_{BS}^2} * \sin(AOA) \qquad \text{Equation 1}$$

Meanwhile, in the current AOA+TA positioning method, a TA($T_{ADV}$) measuring method is defined in 3GPP LTE TS36.314, as follows:

1) Release 9 terminal (type 1)

$T_{ADV}$=(eNB Rx-Tx time difference)+(UE Rx-Tx time difference)

where (eNB Rx-Tx time difference) corresponds to the same terminal as a terminal that reports (UE Rx-Tx time difference).

2) Release 8 terminal (type 2)

$T_{ADV}$=(eNB Rx-Tx time difference)

where (eNB Rx-Tx time difference) corresponds to a received uplink radio frame containing PRACH from a UE.

That is, in the case of the Release 8 terminal, since the report of (UE Rx-Tx time difference) is not defined, eNB measures (eNB Rx-Tx time difference) for PRACH. Since resolution of a TA command from eNB to the terminal is 16 Ts (Ts denotes a sample duration), an error of type 2 increases by +/−8 Ts as compared to type 1.

Meanwhile, (eNB Rx-Tx time difference) is defined as $T_{eNB-RX} - T_{eNB-TX}$. In this case, $T_{eNB-RX}$ is eNB reception timing of an uplink radio frame #i defined by a first detected path, and a reference point of $T_{eNB-RX}$ is a Rx antenna connector. $T_{eNB-TX}$ is eNB transmission timing of a downlink radio frame and a reference point of $T_{eNB-TX}$ is a Tx antenna connector.

Next, (UE Rx-Tx time difference) is defined as $T_{UE-RX} - T_{UE-TX}$. In this case, $T_{UE-RX}$ is UE reception timing of the downlink radio frame #i from a serving cell defined by the first detected path, and $T_{UE-TX}$ is UE transmission timing of the uplink radio frame #i.

Referring to FIG. 8, in the conventional AOA+TA method, since the altitude of the terminal is assumed to be the same as that of the base station, there is a problem in that errors are inevitably generated.

Further, while in the conventional OTDOA method, positioning of the terminal is calculated only using the TA between the terminal and three or more base stations, the altitude ($Z_{UE}$) of the terminal can be measured and positioning errors can be reduced when a vertical-direction angle $AOA_{elevation}$ of the terminal with respect to the base station is separately measured and used.

Accordingly, in the present invention, a method capable of determining a three-dimensional position, including the altitude of the terminal, by separately measuring the vertical-direction angle $AOA_{elevation}$ (or an elevation angle) of the terminal with respect to the base station and performing three-dimensional positioning of the terminal, and reducing positioning errors, is used. Here, the $AOA_{elevation}$ is a vertical-direction estimation angle (or an elevation angle) of a user with respect to a reference plane. This reference plane for measurement is a horizontal plane, and the angle has a value of 0° when the terminal and the base station are at the same altitude, a negative value when the terminal is located lower than the base station, and a positive value when the terminal is located higher than the base station. The $AOA_{elevation}$ is determined at a base station antenna for an uplink (UL) channel for the terminal UE.

Figure 9:
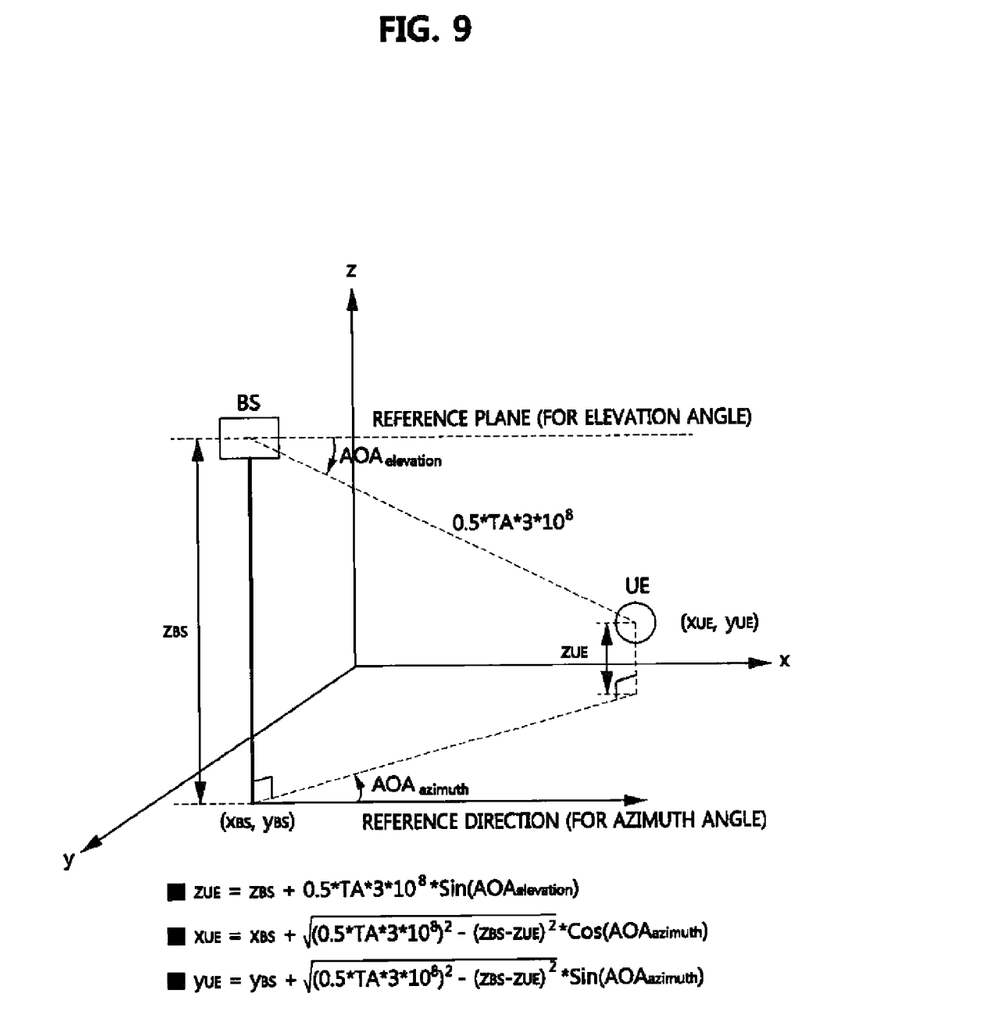
FIG. 9 is a conceptual diagram illustrating an embodiment of a method of positioning a terminal according to a three-dimensional AOA+TA method according to the present invention.

FIG. 9 is a conceptual diagram illustrating an embodiment of a method of positioning a terminal according to a three-dimensional AOA+TA method in the present invention.

Referring to FIG. 9, in the three-dimensional AOA+TA method according to the present invention, a position ($x_{UE}$, $y_{UE}$, $z_{UE}$) of the terminal may be calculated by the following equation 2 by measuring a horizontal-direction AOA ($AOA_{azimuth}$) and a vertical-direction AOA ($AOA_{elevation}$) with respect to the base station having the highest AOA measurement reliability with respect to the terminal and using a TA measurement value (TA) of the terminal, a geographical position ($x_{BS}$, $y_{BS}$) of the base station, and an altitude ($Z_{BS}$) of the base station together with obtained measurement values.

$$z_{UE} = z_{BS} + 0.5 * TA * 3 * 10^8 * \sin(AOA_{elevation})$$

$$x_{UE} = x_{BS} + \sqrt{(0.5 * TA * 3 * 10^8)^2 - (z_{BS} - z_{UE})^2} * \cos(AOA_{azimuth})$$

$$y_{UE} = y_{BS} + \sqrt{(0.5 * TA * 3 * 10^8)^2 - (z_{BS} - z_{UE})^2} * \sin(AOA_{azimuth}) \quad \text{Equation 2}$$

The AOA measurement reliability may be high as a channel between the terminal and the base station is closer to LOS (line of Sight).

Further, the altitude ($Z_{BS}$) of the base station can be measured and positioning errors can be reduced by combining only the vertical-direction AOA ($AOA_{elevation}$) of the terminal with respect to the base station with the OTDOS method.

In an embodiment for this, the altitude ($Z_{UE}$) of the terminal is calculated by the following equation 3 by calculating a geographical position ($x_{UE}$, $y_{UE}$) of the terminal by applying the OTDOA method, measuring an $AOA_{elevation}$ with respect to the base station having the highest AOA measurement reliability with respect to the terminal among base stations capable of measurement of the vertical-direction AOA ($AOA_{elevation}$) of the terminal, and then selecting one of the $AOA_{elevation}$ and the $AOA_{elevation}$.

$$z_{UE} = z_{BS} + \tan(AOA_{elevation}) * \sqrt{(x_{UE} - x_{BS})^2 + (y_{UE} - y_{BS})^2} \quad \text{Equation 3}$$

where $OA_{elevation}$ is a measurement value with respect to the base station having the highest measurement reliability with respect to the terminal among base stations capable of measurement of the vertical-direction AOA ($AOA_{elevation}$), and the AOA measurement reliability may be high as a channel between the terminal and the base station is closer to LOS (line of Sight). This reliability may be obtained, for example, using delay spread measurement of a received signal.

In another embodiment for this, the position ($x_{UE}$, $zy_{UE}$, $z_{UE}$) of the terminal may be ultimately determined by first calculating the position of the terminal based on a timing advance (TA) value with respect to the base station, forming a line, a face, or a space in which the terminal may be located in consideration of an error of the position, measuring a vertical-direction $AOA_{elevation}$ with respect to the base station capable of measuring a vertical-direction AOA ($AOA_{elevation}$) measurement, forming a line, a face, or a space in which the terminal may be located in consideration of the reliability and error of the measurement, and finding an optimal intersection therebetween.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention claimed is:

1. A terminal operating method for positioning a terminal belonging to a heterogeneous network environment, the method comprising:
   transmitting, by the terminal, a positioning request to a positioning server;
   receiving, by the terminal, positioning assistance information containing virtual cell IDs allocated to ambient transmission points around the terminal from the positioning server; and
   performing, by the terminal, measurements on positioning reference signals (PRSs) generated on the virtual cell IDs allocated to ambient transmission points around the terminal.

2. The method of claim 1, wherein the heterogeneous network environment is an environment in which a plurality of transmission points having overlapping coverages have the same physical cell IDs.

3. The method of claim 1, wherein the positioning request is transmitted from the terminal to the positioning server via a mobility management entity (MME).

4. The method of claim 3, wherein the mobility management entity delivers at least one of an identification of the terminal which is a physical cell ID and a coverage of a base station in which the terminal is included, to the positioning server.

5. The method of claim 1, further comprising:
   notifying, by the terminal, the positioning server of results of measuring positioning reference signals (PRSs) of the ambient transmission points, and
   receiving position information of the terminal from the positioning server.

6. A terminal operating method for positioning a terminal belonging to a heterogeneous network environment, the method comprising:
   making, by the terminal, a request for positioning assistance information to a positioning server, the request containing an ID of a serving cell of the terminal and at least one of an ID of the terminal and a virtual cell ID of an ambient transmission point around the terminal; and
   receiving, by the terminal, the positioning assistance information containing virtual cell IDs allocated to ambient transmission points around the terminal from the positioning server.

7. The method of claim 6, wherein the heterogeneous network environment is an environment in which a plurality of transmission points having overlapping coverages have the same cell IDs.

8. The method of claim 6, further comprising:
   notifying, by the terminal, the positioning server of results of measuring positioning reference signals (PRSs) of the ambient transmission points, and
   receiving position information of the terminal from the positioning server.

9. A method of operating a mobility management entity (MME) and a positioning server to position a terminal belonging to a heterogeneous network environment, the method comprising:

receiving, by the mobility management entity, a positioning request from the terminal;

transmitting, by the mobility management entity, the positioning request containing at least one of an identification of the terminal which is a physical cell ID and a coverage of a base station in which the terminal is included, to the positioning server; and providing, by the positioning server, information containing virtual cell IDs allocated to ambient transmission points around the terminal to the terminal in response to the positioning request, wherein the terminal performs measurements on positioning reference signals (PRSs) generated based on the virtual cell IDs allocated to the ambient transmission points around the terminal.

10. The method of claim 9, wherein the heterogeneous network environment is an environment in which a plurality of transmission points having overlapping coverages have same physical cell IDs.

11. The method of claim 9, further comprising:

providing, by the positioning server, the physical cell ID of the terminal to a serving cell base station to which the terminal belongs, and receiving information for ambient points around the terminal from the base station.

12. The method of claim 9, further comprising;

receiving, by the positioning server, results of measuring positioning reference signals (PRSs) of the ambient transmission points from the terminal, and transmitting position information of the terminal from the terminal.

13. A method of positioning a terminal, the method comprising:

measuring a vertical-direction AOA ($AOA_{elevation}$) and a horizontal-direction AOA ($AOA_{azimuth}$) with respect to each base station among a plurality of base stations;

measuring a timing advance (TA) value of each terminal with respect to the each base station; and determining a position ($x_{UE}$, $y_{UE}$, $z_{UE}$) of each terminal based on the measured vertical-direction AOA ($AOA_{elevation}$) and horizontal-direction AOA ($AOA_{azimuth}$) with respect to each base station.

14. The method of claim 13, wherein the position ($x_{UE}$, $y_{UE}$, $z_{UE}$) is determined based on the vertical-direction AOA ($AOA_{elevation}$), the horizontal-direction AOA ($AOA_{azimuth}$) and the timing advance (TA) value with respect to each base station, and a three-dimensional geographical position ($x_{BS}$, $y_{BS}$, $a_{BS}$) of each base station.

15. The method of claim 13, wherein the horizontal-direction AOA ($AOA_{azimuth}$) is measured with respect to the base station having the highest AOA measurement reliability with respect to the terminal among the base stations, and wherein the position ($x_{UE}$, $y_{UE}$, $z_{UE}$) is determined based on the horizontal-direction AOA ($AOA_{azirmuth}$), the vertical-direction AOA ($AOA_{elevation}$) and the timing advance (TA) value with respect to the base station, and a three-dimensional geographical position ($x_{Bs}$, $y_{BS}$, $z_{BS}$) of the base station.

* * * * *